UNITED STATES PATENT OFFICE.

WILLIAM P. EMERY, OF TOPEKA, KANSAS.

ARTIFICIAL CEMENT.

SPECIFICATION forming part of Letters Patent No. 579,142, dated March 23, 1897.

Application filed August 5, 1895. Serial No. 558,299. (No specimens.)

*To all whom it may concern:*

Be it known that I, WILLIAM P. EMERY, of Topeka, Shawnee county, Kansas, have invented a new and useful Composition of Matter for Artificial Cement, of which the following is a full, clear, and exact description.

My composition consists of the following ingredients combined in the proportions stated, viz: New Orleans molasses, fifteen pounds; granite fiber, five pounds; oxid of iron, five pounds; plumbago, ten pounds; rosin, sixty pounds; paraffin, five pounds. The granite fiber above referred to differs from asbestos and mineral wool made from slag in that it is evolved from fused granite by subjecting the granite while in such fused condition to the action of a jet of fluid. These ingredients are to be thoroughly mingled by agitation and then placed in a kettle or caldron and heated until all of the component parts are thoroughly intermingled and amalgamated. It can then be poured into suitable receptacles or molds and is cast into blocks or bricks of any desired dimensions. After thoroughly cooling my artificial cement is possessed of remarkable cohesive powers when remelted and heated, and is peculiarly adapted in such plastic state for calking purposes in making water-tight joints, such as are made in the hulls and decks of vessels, waterproof joints for the protection of airways under sidewalks, also for closing joints of casks, water-tanks, &c.; but I do not wish it understood that the usefulness and beneficial results of my artificial cement stop here, for it does not, as it is not unlike, in many respects, that of other cements, for it can be successfully used with the same results for hardening or tempering building or other materials that are made in a plastic state before using. This hardening or tempering of the materials suggested takes place owing to the fact that the composition possesses great affinitive powers for ordinary cement, and the product of amalgamation is consequently tougher, harder, and stronger in every way than such building materials alone. The chief characteristic of the ordinary building material—viz., brittleness and its tendency to crumble under a comparatively light pressure—is entirely destroyed or obviated.

I am aware that some of the ingredients that I employ for the production of my compound are old and well known to the public, particularly molasses and rosin, but I am not aware that any of them have ever been used in the proportions stated for the purposes herein set forth.

What I claim, and desire to secure by Letters Patent of the United States, is—

The herein-described composition of matter, to be used for the production of an artificial cement, consisting of molasses, granite fiber, oxid of iron, plumbago, rosin, and paraffin, in the proportions and for the purposes specified.

In testimony whereof I affix my signature in presence of two witnesses.

WILLIAM P. EMERY.

Witnesses:
 G. Y. THORPE,
 M. R. REMLEY.